H. W. MERRITT.
TYPE WRITING MACHINE.
APPLICATION FILED JUNE 27, 1905.
904,708.
Patented Nov. 24, 1908.
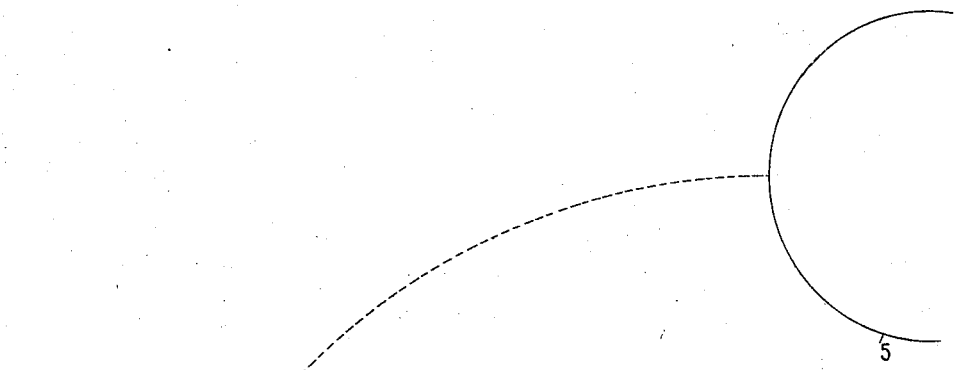
Fig.1.
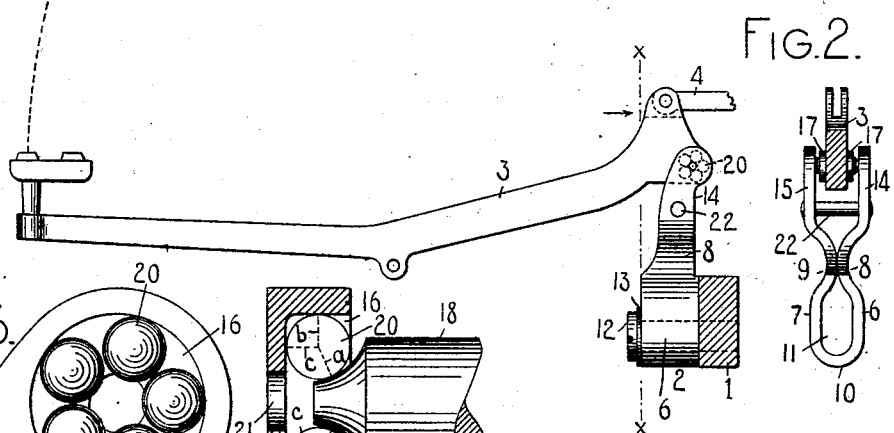
Fig.2.
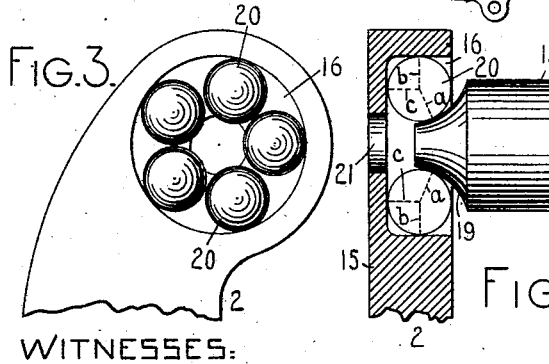
Fig.3.
Fig.4.
WITNESSES:
E. M. Wells.
M. W. Pool.
INVENTOR:
Henry W. Merritt
By Jacob Felbel
His ATTORNEY
THE NORRIS PETERS CO., WASHINGTON, D. C.

UNITED STATES PATENT OFFICE.

HENRY W. MERRITT, OF SYRACUSE, NEW YORK, ASSIGNOR TO THE MONARCH TYPEWRITER COMPANY, OF SYRACUSE, NEW YORK, A CORPORATION OF NEW YORK.

TYPE-WRITING MACHINE.

No. 904,708.  Specification of Letters Patent.  Patented Nov. 24, 1908.

Application filed June 27, 1905. Serial No. 267,179.

*To all whom it may concern:*

Be it known that I, HENRY W. MERRITT, a citizen of the United States, and resident of Syracuse, in the county of Onondaga and State of New York, have invented certain new and useful Improvements in Type-Writing Machines, of which the following is a specification.

My invention relates more particularly to the type bar bearings of typewriting machines and has for its main object to provide an improved construction of ball bearings for the type bars.

In the accompanying drawings, Figure 1 is a side elevation of a type bar and hanger embodying my invention and showing the relation of the parts to the platen of the machine. Fig. 2 is a view partly in section taken on a plane represented by the line x—x in Fig. 1, but omitting some of the parts shown in the latter figure. Fig. 3 is an enlarged view showing the inside of one of the ball bearing cups and with a set of anti-friction balls seated therein. Fig. 4 is an enlarged fragmentary sectional view taken on a plane passing through the center of rotation of the type bar.

In the drawings, 1 is a type-bar hanger support, 2 is a hanger secured thereto and 3 is a type bar mounted in the hanger and connected by a link 4 with a known construction of actuating mechanism by which said type bar is caused to coöperate with a platen 5. The particular construction illustrated is that of a front-strike typewriting machine but my improvement is not limited to any special style of writing machines.

The hanger 2 is preferably made of sheet metal bent into a U-shape so as to form side walls 6 and 7, said walls being contracted or bent inwardly at 8 and 9 so as to form in conjunction with the central bend 10 in the hanger, a slot 11, through which passes a securing screw 12, which screws into the support 1 and enables the hanger to be fixed in place in the machine. A washer 13 is interposed between the head of the securing screw and the hanger. Beyond the inwardly bent portions 8 and 9 the sides of the hanger are again bent outwardly or away from each other to provide bearing walls 14 and 15. These walls are parallel and near their ends are depressed or cut away to form cups 16.

The hub 17 of the type bar is centrally perforated and a pivot pin 18 has a driving fit in the perforation, the ends of said pivot pin being tapered or curved as indicated at 19, thereby forming offset pivot portions.

In each cup 16 are seated a plurality of anti-friction balls 20, preferably five in number, said balls surrounding the pivot ends 19 and contacting with the pivot at the ends of the radii $a$. The balls contact with the cup 16 at the ends of the radii $b$ and $c$, the contact points $a$, $b$ and $c$ being so disposed that the balls 20 will always be maintained in proper position and will be prevented from creeping inwardly towards the longitudinal axis of the type bar and away from the bottom of their cups 16. The bearing walls are perforated at 21 to provide openings through which a lubricant may be applied to the ball bearings.

Between the contracted portions 8 and 9 and the ball cups, the bearing walls 14 and 15 are connected by a rivet 22 which holds said walls in a fixed relation and which permits said relation to be altered to take up wear in the bearings.

Various changes may be made in the construction and arrangements of parts without departing from the spirit of my invention, which provides a simple and efficient ball bearing for the type bar capable of being manufactured at small cost.

What I claim as new and desire to secure by Letters Patent, is:—

1. In a typewriting machine, the combination of a hanger having parallel bearing walls and a contracted portion which assists to form an opening for the hanger screw, race-ways formed in said hanger walls, anti-friction balls in said race-ways, and a type bar provided with a pivot the ends whereof enter said race-ways and co-act with said anti-friction balls.

2. In a typewriting machine, the combination of a hanger having parallel bearing walls and a contracted portion which assists to form an opening for the hanger screw, race-ways formed in said hanger walls, anti-friction balls in said race-ways, a type bar provided with a pivot the ends whereof enter said race-ways and co-act with said anti-friction balls, and means adapted to be altered to change the relation between said bearing walls.

3. In a typewriting machine, the combination of a hanger having parallel bearing walls and a contracted portion which assists to form an opening for the hanger screw, race-ways formed in said hanger walls, anti-friction balls in said race-ways, a type bar provided with a pivot the ends whereof enter said race-ways and co-act with said anti-friction balls, and a rivet connecting said bearing walls and adapted to be altered to change the relation between said walls.

4. In a typewriting machine, the combination of a sheet metal hanger bent to form parallel bearing walls and having a contracted portion which limits the size of the opening which receives the hanger securing screw, said bearing walls themselves being cut away or depressed to provide race-ways, anti-friction balls in said race-ways, a type bar provided with a pivot the ends whereof enter said race-ways and co-act with said anti-friction balls in such wise as to prevent the latter from working towards the longitudinal axis of said type bar, and a rivet connecting said bearing walls and adapted to be altered to change the relation between said walls.

5. In a typewriting machine, the combination of a sheet metal type bar hanger having integrally formed race-ways; anti-friction balls in said race-ways; and a type bar having off-set pivot portions entering said race-ways and co-acting with said balls, said hanger being contracted between its ends to form a slot for the hanger securing screw.

6. In a typewriting machine, the combination of a sheet metal type bar hanger having integrally formed race-ways; anti-friction balls in said race-ways; a type bar having off-set pivot portions co-acting with said balls; and a rivet connecting the sides of the hanger and adapted to be altered to change the relation between them, the sides of the hanger being contracted or drawn together to form a slot for the hanger securing screw, said rivet being between the contracted portion of the hanger and the race-ways therein.

Signed at Syracuse, in the county of Onondaga and State of New York this 23d day of June, A. D. 1905.

HENRY W. MERRITT.

Witnesses:
WM. SEARS,
S. W. CRANDALL.